US008108852B2

(12) United States Patent
Petig et al.

(10) Patent No.: US 8,108,852 B2
(45) Date of Patent: *Jan. 31, 2012

(54) ONLINE MODIFICATION OF CIL CODE PROGRAMS FOR INDUSTRIAL AUTOMATION

(75) Inventors: Michael Petig, Bielefeld (DE); Steffen Schlette, Bad Oynhausen (DE); Hanno Lewandowski, Bielefeld (DE)

(73) Assignee: KW-Software GmbH, Lemgo (DE)

( * ) Notice: Subject to any disclaimer, the term of this patent is extended or adjusted under 35 U.S.C. 154(b) by 1405 days.

This patent is subject to a terminal disclaimer.

(21) Appl. No.: 10/903,863

(22) Filed: Jul. 30, 2004

(65) Prior Publication Data
US 2005/0066320 A1 Mar. 24, 2005

(30) Foreign Application Priority Data
Aug. 1, 2003 (DE) .................................. 103 35 989

(51) Int. Cl.
*G06F 9/44* (2006.01)
(52) U.S. Cl. ...................... 717/169; 717/168; 717/170
(58) Field of Classification Search ........................ None
See application file for complete search history.

(56) References Cited

U.S. PATENT DOCUMENTS

| | | | |
|---|---|---|---|
| 6,092,076 A | 7/2000 | McDonough et al. | |
| 6,202,208 B1* | 3/2001 | Holiday, Jr. .................. | 717/166 |
| 6,260,187 B1* | 7/2001 | Cirne ............................ | 717/110 |
| 6,272,677 B1* | 8/2001 | Lam et al. ..................... | 717/170 |
| 6,282,698 B1* | 8/2001 | Baker et al. ................... | 717/118 |
| 6,298,353 B1 | 10/2001 | Apte | |
| 6,389,592 B1* | 5/2002 | Ayres et al. ................... | 717/172 |
| 6,675,381 B1 | 1/2004 | Yamaguchi ................... | 717/168 |
| 6,691,080 B1* | 2/2004 | Tachibana ....................... | 703/19 |
| 6,728,957 B1* | 4/2004 | Nakazato ....................... | 718/100 |
| 6,973,646 B1* | 12/2005 | Bordawekar et al. ......... | 717/146 |
| 7,461,373 B2* | 12/2008 | Herle et al. .................... | 717/171 |
| 2002/0188935 A1 | 12/2002 | Hertling et al. ............... | 717/170 |
| 2003/0182414 A1* | 9/2003 | O'Neill .......................... | 709/223 |
| 2004/0073893 A1* | 4/2004 | Rajaram et al. ............... | 717/136 |

(Continued)

FOREIGN PATENT DOCUMENTS

JP 07200279 8/1995

(Continued)

OTHER PUBLICATIONS

Franz, M., "Dynamic linking of software components," IEEE Computer, vol. 30, No. 3, Mar. 1997, pp. 74-81.

(Continued)

*Primary Examiner* — Jason Mitchell
(74) *Attorney, Agent, or Firm* — Ohlandt, Greeley, Ruggiero & Perle, LLP

(57) ABSTRACT

A procedure is provided to implement modifications to a running object-oriented program, in particular a program for controlling an automation facility. The program is stored temporarily in a memory in the form of an intermediate code which can be converted into executable machine code in runtime. The method includes the steps of providing a modified program or a modified program module, also in the form of an intermediate code, and comparing the intermediate code of the modified program or that of the modified program module with the intermediate code of the running program for determining the modifications, and implementing modifications to the running program. A correspondingly adapted run-time system is also provided, which is suitable for implementing the procedure as well as the integration of this run-time system into an automation facility.

23 Claims, 3 Drawing Sheets

U.S. PATENT DOCUMENTS

| | | | | |
|---|---|---|---|---|
| 2004/0107416 | A1* | 6/2004 | Buban et al. | 717/170 |
| 2005/0125776 | A1* | 6/2005 | Kothari et al. | 717/131 |
| 2005/0257205 | A1* | 11/2005 | Costea et al. | 717/168 |
| 2006/0015861 | A1* | 1/2006 | Takata et al. | 717/168 |
| 2006/0236317 | A1* | 10/2006 | Wetherly et al. | 717/168 |

FOREIGN PATENT DOCUMENTS

| | | |
|---|---|---|
| JP | 08095807 | 4/1996 |
| JP | 11306008 | 11/1999 |
| JP | 2002318703 | 10/2002 |

OTHER PUBLICATIONS

Neable, C., "The .NET Compact Framework," IEEE Pervasive Computing, vol. 1, No. 4, Oct.-Dec. 2002, pp. 84-87.

Brugali, D. et al., Distributed computing in robotics and automation, IEEE Transactions on Robotics and automation, vol. 18, No. 4, Aug. 2002, pp. 409-420.

Biermann, G. et al., "Dynamic rebinding for marshalling and update, with destruct-time $\lambda$," Proceeding of the $8^{th}$ ACM SIGPLAN international conference on Functional programming 2003, pp. 99-110.

Adl-Tabatabai, A.-R. et al., "Fast, effective code generation in a just-in-time Java compiler," ACM SIGPLAN Notices, ACM, Association for Computing Machinery, New York, vol. 22, No. 5, May 1998, pp. 280-290.

Segal, M., "On-the-fly program modifications," IEEE Software, IEEE Service Center, CA, vol. 10, No. 2, Mar. 1993, pp. 53-65.

Japanese Office Action dated Feb. 18, 2010 for corresponding Japanese Patent Application No. 2007-336097 (with English translation).

Office Action dated Mar. 29, 2010 corresponding to Japanese Patent Application No. 2007-336097.

Examiner's Office Letter dated May 13, 2011 corresponding to Japanese Patent Application No. 2007-336097.

* cited by examiner

ONLINE MODIFICATION OF CIL CODE PROGRAMS FOR INDUSTRIAL AUTOMATION

CROSS-REFERENCE TO RELATED APPLICATION

The present application is claiming priority of German Patent Application No. 103 35 989.3, filed on Aug. 1, 2003, the content of which is herein incorporated by reference.

BACKGROUND OF THE INVENTION

1. Field of the Invention

Generally speaking, the invention concerns industrial automation systems, and in particular procedures for modifying a running object-oriented program, in particular a program for controlling an automation facility as well as run-time systems for executing control programs in a control unit of an automation facility

2. Description of the Related Art

Control systems are being used more and more often, especially to control or regulate large-scale industrial processes or operating sequences, for instance in industrial manufacturing or final assembly. Similarly, they are used to monitor such processes that are operated automatically to the greatest possible extent as well as to illustrate the current process status.

Such automation facilities or automated plants have attained an outstanding importance in industrial manufacturing because of the high degree of productivity that they facilitate.

To avoid productivity outages, it must be possible to modify the control program of an automation facility without the need to stop the automation facility or put it into a certain state.

Otherwise, for example in the case of a packing machine, it would be necessary to remove both the entire packaging material as well as the goods that are to be packed if the relation between the control program and the current content of the variables contained in it are lost as the result of a program modification and hence the information on the current process state is no longer available.

To enable a modified program to be adopted regardless of the respectively current state of the automation facility, certain requirements need to be met. On the one hand, the program changeover has to take place in real time. This means that the set response times or execution intervals of the control program must not be exceeded. In addition, it is vital that the current program state, especially the data, which, for example, contain information on the current process state of the automation facility, be maintained and continue to be used by the modified program.

In the case of SPS control systems, as they are used in industrial automation, a variety of different programming systems are today already capable of implementing program modifications, without having to interrupt the program execution. This feature is frequently referred to as "online programming". However, these systems use processes that demand a tight coordination between the programming system and run-time system of the control system. In doing so, the programming system manages the information relating to the state of the program prior to the modification, thus deriving from it the necessary measures needed to implement the program modifications.

Present-day programming systems are, however, frequently characterized by constraints in terms of functionality. Thus, for example, the real-time aspect is generally only rarely taken into consideration. Rather it is assumed that the duration of the interruption of the program execution is non-critical. This is actually the case with programming systems that only permit modifications of program commands, but which do not, however, support changes to variables objects or the object structure (instancing). Other systems employ global data objects, where the user addresses the program variables manually. Here, the user is responsible for ensuring that the variables keep their old content after the program modifications have been implemented. The main disadvantage of such simple programming models is that they are not object-oriented and do not allow data encapsulation.

The demands on the programming system used result in it only being possible to use programming tools that have been specially developed for deployment in the field of industrial control engineering.

SUMMARY OF THE INVENTION

The aim of the invention is therefore to identify constructive ways of solving the problem of how to carry out modifications to a control program of an automation facility whilst it is running, given an extensive or even essentially complete reduction of the limitations imposed hitherto on the functionality of a deployed programming system. In particular, the aim is to modify the program using a programming tool, which has not been adapted specifically for this purpose.

Another task of the invention is the indication of a way of adhering to the real-time requirements of an automation facility when modifying a running control program.

The task can be solved astoundingly easily using an object based on one of the appended independent patent claims. Useful embodiments and further developments are outlined in the sub-claims.

To begin with, however, several terms shall be defined or clarified that are applicable to the description and the patent claims as a whole.

In object-oriented programming, a class describes an abstract entity that reproduces an object. An object constitutes an instance of a class, i.e. an image in the memory of a computer system that is generated based on the class template.

A class can have different so-called members. Among others, these include methods and fields of the class. A sub-class can also be a member of a class.

A stack refers to a dedicated storage area in which a program buffers status data. A heap is part of the memory where data structures are stored temporarily, the existence and size of which cannot be determined prior to running the program.

The method according to the present invention for modifying a running object-oriented program, and in particular a program for controlling an automation facility, which is stored in a memory in the form of intermediate code and can be converted into executable machine code in run time, includes the provision of a modified program or a modified program module, also in the form of intermediate code, comparison of the modified program's intermediate code with the intermediate code of the running program for determining the modification, as well as the implementation of the modifications in the running program.

The great advantage of this procedure lies in the fact that a programming tool that generates intermediate code from source code does not need to generate any additional information about the implemented program modifications. The programming tool therefore does not require any additional functions to implement program modifications in a running process. This task is assumed by the run-time system, and in particular an eCLR run-time system (Embedded Common Language Runtime). This enables program modifications to be supported while the process is running using programming tools, which have not been specially developed for use in the field of industrial control engineering.

Here it is preferable to use a CIL—(Common Intermediate Language) or a MSIL (Microsoft Intermediate Language) intermediate code as the intermediate code. CIL and MSIL are different terms for the same intermediate code. The CIL intermediate code is a constituent part of Microsoft's(r) NET platform. The advantage of using the CIL intermediate code lies in the fact that it contains a complete description for the structuring of classes.

It is preferable to convert intermediate code into executable machine code using a JIT (Just-in-time) compiler, which is also part of the NET platform.

It is preferable that the implementation of modifications to the running program includes the generation of one or more first program object(s); the copying of data contained in one or more second program object(s) into the aforementioned one or more first program object(s)—the second program object(s) being part of the running program—; and the switching from the one or more second program object(s) to the one or more first program object(s), whereas the second program object(s) is/are part of the running program.

This has the advantage that by executing certain steps in the background, it is possible to prepare the program modification.

In addition, a modification program is generated, which is very useful for implementing the modifications. As a rule, this is done by the runtime system and serves to provide an organized automatic sequence of the steps required to implement the program modification. For this purpose, for example, the runtime system generates intermediate code, which is converted into executable machine code by the JIT compiler and executed automatically.

Preferably, after the modifications have been implemented, the memory allocated to the program objects, which are no longer used, is deallocated. The so-called "garbage collection" function of a CLR runtime system can be used for this purpose.

Processes that run on automation facilities are generally subject to certain real-time requirements. Based on the real-time criteria, which have to be adhered to, it is possible, subject to at least one response time of an automation system controlled by the program and/or subject to at least one execution interval of the program, to set a maximum time that must not be exceeded when implementing the modifications.

To this end the procedure includes a useful function that can determine the time required for implementing the modifications by means of simulation.

Also of particular advantage is the fact that the modifications are implemented in at least two substages. Here, preparatory measures are implemented during the first substage, for example, the generation of program objects and the copying of data, and in the second substage the system is, for example, switched to the newly-generated program objects. If during the first substage, an event takes place in the operating sequence of the running program, which, for example, might result in data that have already been copied being modified, it is possible to repeat the first substage at a later point in time.

If the running program switches cyclically between an active and an idle state, as it is usual in the case of control programs, the procedure can among other things conveniently calculate one or more points in time when the program switches to its active state.

If the time required for the modifications to be implemented is also known, it is possible to determine for a specific point in time whether the modifications can be implemented whilst at the same time adhering to the real-time conditions of an automation facility.

In addition, the invention also includes a run-time system for executing control programs in a control unit of an automation facility, especially for implementing the procedure described above, including means for reading and writing memory contents, where: the control unit has an addressable memory and a control program is retrievably filed in the form of a first intermediate code in a first memory area; at least parts of the first intermediate code can be converted into executable control commands which are filed in a second memory area while the process is running in the automation facility; the run-time system responds to the provision of a second intermediate code allocated in a third memory area thereby modifying the process sequence in the automation facility.

The operating sequence in the automation facility can be modified conveniently by selecting at least one partition of the third memory area and at least one storage unit of the second memory area, in which the start address of a partition of the second memory area is stored; by comparing the first intermediate code stored in the first memory area and the second intermediate code stored in the third memory area; by converting the intermediate code stored in the partition of the third memory area into executable control commands, which in turn are stored in a fourth memory area; by copying data from the partition of the second memory area into the partition of the third memory area; and by storing the start address of the fourth memory area in the storage unit of the second memory area.

The run-time system is preferably a CLR run-time system, especially an eCLR run-time system, since this type of run-time system features functions that are particularly suitable for achieving the effect described above.

As already mentioned in the description of the procedure according to the present invention, it is preferable to us a CIL intermediate code as the intermediate code. Furthermore, the run-time system for converting an intermediate code into executable control commands should also preferably include a JIT compiler.

In order to execute the program modifications in an organized way, the run-time system features useful means for generating, storing and executing control commands.

When using the run-time system in real-time environments, it is possible to effect a modification in the process sequence within a given period of time. To this end, the run-time system includes useful means for calculating the period required to effect a modification in the process sequence of an automation facility.

To adhere to real-time conditions, the routines, which are run in order to effect a modification in the process sequence of an automation facility, can be repeated either in their entirety or partially.

The scope of the invention also includes the identification of an automation system in which the run-time system described above is integrated and which is suitable for carrying out the procedure described above.

In the following, the invention will be outlined in greater detail exemplified on the basis of preferred embodiments and with reference to the enclosed drawings. In doing so, identical reference signs in the drawings refer to identical or similar components.

DESCRIPTION OF THE INVENTION

Figure 1:
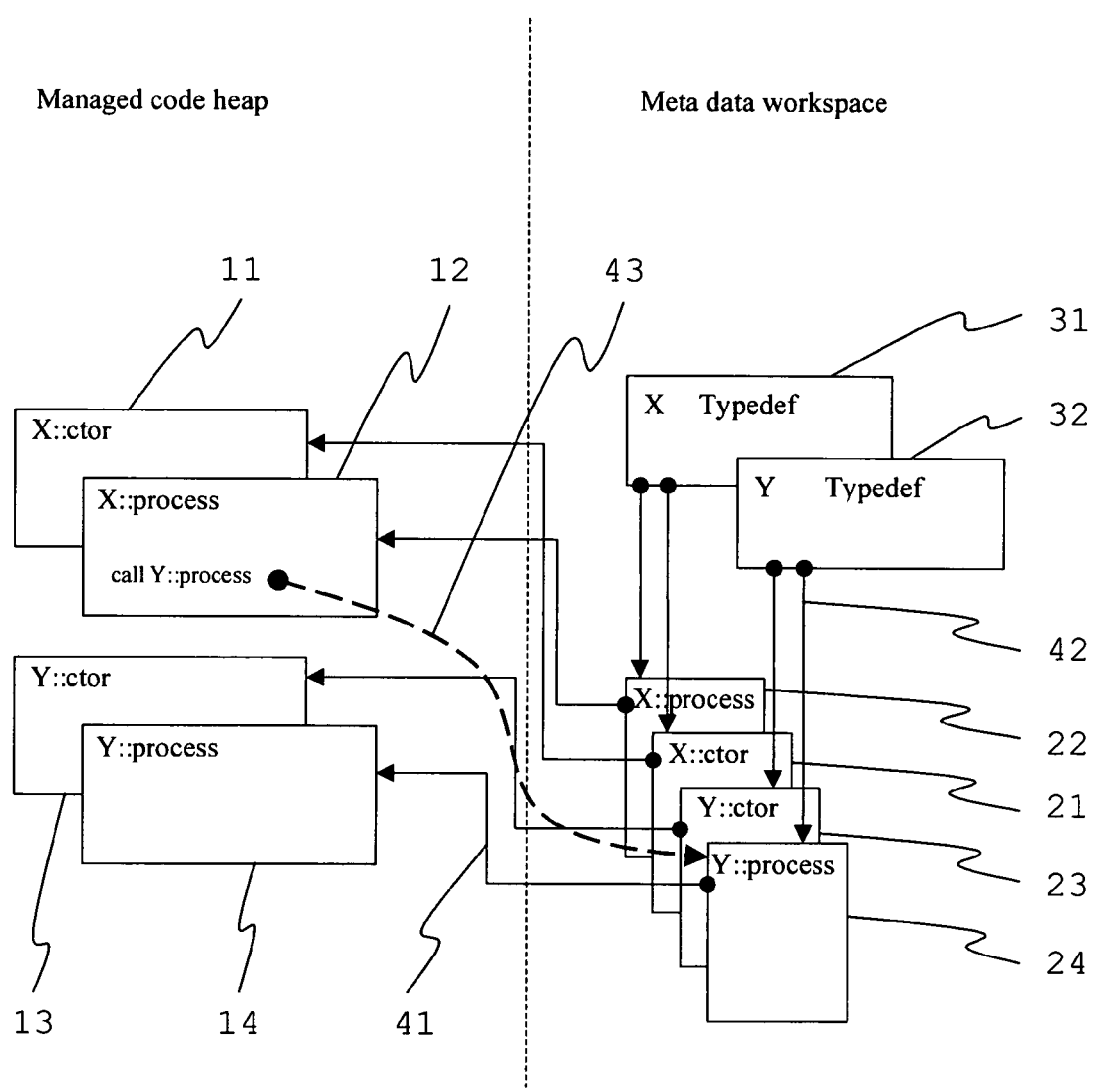
FIG. 1: shows a schematic representation of the metadata and the code representation of an assembly.

In the following embodiment of the procedure according to the present invention, an eCLR run-time system is used, which serves to execute programs on the basis of the CIL intermediate code specified in the ECMA standard (European Computer Manufacturers' Association). An eCLR run-time system uses the specifications of the Common Language Infrastructure (CLI) of Microsoft's(r) NET platform.

The eCLR run-time system to be considered allows modifications to be made to a control program of an automation facility while it is in operation. A control program, here in the form of CIL intermediate code, is as a rule made up of individual modules (assemblies), each of which in turn includes CIL intermediate code. The control program is therefore essentially modified by adopting and activating one or more modified assemblies.

First of all, the modifications are made to the source code of the program or the assemblies that are to be modified. The source code can be programmed in a variety of different programming languages, for example, C# or in a programming language that corresponds to the IEC61131 specification. A CIL intermediate code is generated from the modified source code using a programming tool. Any programming tool that can generate CIL intermediate code is suitable for this purpose.

The CIL intermediate code of all modified assemblies is now loaded into the eCLR run-time system.

In the next step, the eCLR run-time system analyses the newly loaded CIL intermediate code modules and compares these with the program that is currently being run. In doing so, all existing differences are detected. This is made possible by the fact that the CIL intermediate code contains a complete description for the structure of classes, including not only the methods, but also the fields of a class.

Next, the program update is prepared. Here, the eCLR run-time system generates program code, which organizes the individual measures to be adopted. This includes in particular the adoption of all existing data, which are to be used in the modified program, too. In addition, new data are initialized. Part of the generated program code includes so-called copy constructors and delta constructors.

A copy constructor and a delta constructor are generated for each modified class. During a next step, the objects of the modified class are generated by means of the New operator, following which the delta constructor is executed. In this step, all additional new members of the class are generated and/or initialized. In the next step, the copy constructor copies the current values for the objects into the old class. Finally, all references of the old objects are switched to the new objects. For this step of the execution, the control program is blocked for a brief period of time.

The eCLR run-time system controls the references of any given program, which are also referred to as managed data. A reference is stored to the heap. The stack contains a reference to the memory address in the heap. The generation and release, the allocation of memory space and access to members of a class is organized using pointers.

Each assembly includes so-called meta data, which can be accessed during run time.

FIG. 1 shows the interplay 41 between meta data (21 through 24, 31 and 32) and code representation 11 through 14 of an assembly. Each assembly contains information about classes, shown in FIG. 1 for example as X and Y, as well as their fields 31, 32 and methods 21 through 24. This information is included in the meta data of an assembly. The methods and fields of a class also show dependencies 42. Whenever an assembly is loaded into the eCLR system, the corresponding intermediate code is converted into executable machine code by the JIT compiler. Each method of a class is represented by a continuous code block 11 through 14 in the memory's managed code heap. All necessary information concerning the classes and methods, for example which method belongs to which class or the method signatures, are stored in a static data area, the meta data workspace. When the code block 12 representing a method 22 of class X is executed, it is also possible, for example, to have an access 43 to a method 24 of class Y. Each assembly comprises one or more classes. If it becomes necessary to modify or exchange an assembly, the differences between the corresponding classes of the running assembly and the modified assembly are first of all evaluated. Here a variety of different cases are taken into consideration.

In the first case, both classes contain identical methods and fields. Similarly, the intermediate code is also identical. This can, for example, be verified with the aid of CRC verification of the code. Since there is no discrepancy between intermediate codes, no further steps are necessary in this case.

In the second case, both classes contain identical methods and fields. However, compared to the corresponding class of the running assembly, one or more methods of the class of the modified assembly reveal modified intermediate code. In this case, a compilation for the modified method is carried out and the pointer to the code that is generated in this way is allocated to the descriptor of the original method. In this case, switching is very quick since only one pointer element is allocated.

In the third case, both classes no longer contain the same methods. This can be the case either if the modified class reveals an additional method, if the original class no longer includes a previously existing method or both classes include methods with differing signatures. In this case, it may be necessary to delete one of the methods. If this is the case verification is performed in order to ascertain whether the method which is to be deleted contains a reference to the active code once all modifications have been performed. This is illustrated in the following example. In this example we shall consider two assemblies A and B, where assembly A contains class X and assembly B contains class Y. Method X::process( ) calls up method Y::process( ). If method process( ) of class Y is now deleted, additional corresponding modifications are implemented in method X::process( ). In this connection, it may also be necessary to modify more than one assembly at the same time.

In the fourth case, at least one field of the two classes is different. In this case, the object will have to be modified. Here verification in terms of deleted fields is performed first, which takes place along the same lines as the verification described in case three. If all modifications are permissible, a copy constructor is generated.

A basic explanation of how a modified class adopts the members of the original class type is given below. As a rule, this is done with the aid of copy constructors. A copy constructor is a special function that copies all class members contained in both the old as well as the new class types.

To determine whether or not a class member is contained in both classes it is necessary to differentiate between three cases.

If the names and data types of the class member are identical, the class member will also be identical. This first case describes a strong relationship between the class members. All class members to which this case applies are copied 1-to-1 by the copy constructor.

If only the names of the class members are identical and the data type is an elementary data type, there is a weak relationship between the class members. All class members to which this case applies are copied and transformed, for example, from the 'byte' data type to the 'int' data type.

If neither the first nor the second case applies, the class members are deemed to be different and thus unrelated. These class members are not processed by the copy constructor.

Figure 2:
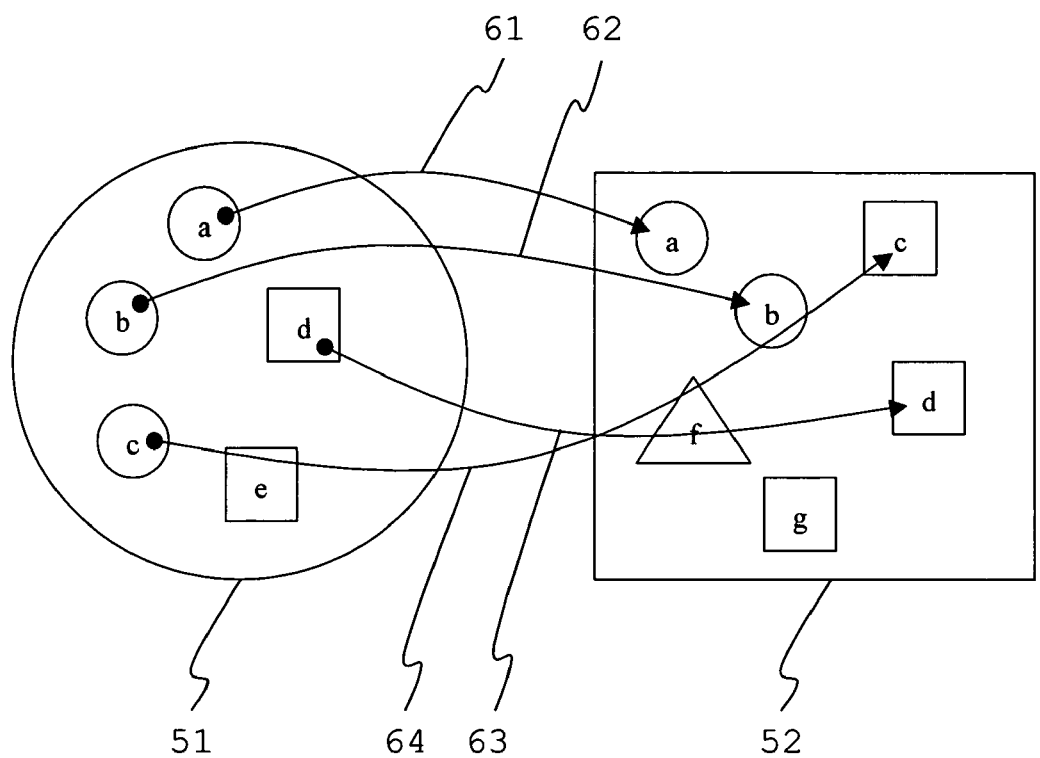
FIG. 2: shows the modification of fields of a class.

This is described once more by way of an example in FIG. 2. Class members a, b and d of an initial class 51 are identical to class members a, b and d of a modified class 52 and are copied by the copy constructor, represented in Fig. X by arrow-bearing reference signs 61 to 63. Class member c in class 51 has the same name as class member c in class 52, but is of a different data type. There is a weak relationship between the two class members bearing the name c. Therefore, when copying class member c, a transformation 64 also takes place. Class members e, f and g are unrelated and are therefore not processed by the copy constructor.

The copy constructor only takes into account non-static class members, since static class members are only represented per class type and not per instance.

By accessing the meta data of the original and a modified class type, the eCLR run-time system is able to analyze differences between class types and generate a copy constructor that corresponds to the respective class type.

An example of a copy constructor in the form of intermediate code is shown below.

.method public hidebysig instance void copyctor( . . . )
ldarg,0

```
ldarg.1
ldfld int32 Application.Test2/* 02000005 */::x1/* 04000022 */
stfld int32 Application.Test1/* 02000006 */::x1/* 04000025 */
ldarg,0
ldarg.1
ldfld char Application.Test2*/::x2 /* 04000023 */
stfld int32 Application.Test1/* 02000006*/::x2/* 04000026 */
ldarg.0
ldarg.1
ldfld int32 Application.Test2/* 02000005 */::x3/* 04000024 */
stfld int32 Application.Test1/* 02000006 */::x3/* 04000027 */
ret
```

Essentially, a copy constructor includes the two intermediate code commands ldfld (load field) and stfld (store filed). This pair of commands is used for fields that do not differ in terms of their data types. A weak relationship between the fields is assumed if the data types differ, but belong to the following elementary data types: bool, int8, uint8, int16, uint16, int32, uint32, int64, uint64, real32, real64. In these cases it may be necessary to use operators such as conv.i4 (int32) or conv.r4 (real32) in order to transform class member displaying a weak relationship to one another.

The following example quoted in the form of intermediate code converts field X1 of one class of data type int into data type real:

```
ldfld X: :X1 // int datatype
conv.r4
stfld X*: :X1 // real datatype
```

The eCLR run-time system converts the copy constructor into executable machine code by means of the JIT compiler. The Intel-based assembler code shown below could, for example, be the result of the conversion of a copy constructor.

```
mov esi dword ptr [ebp+8]    ; source object
mov edi dword ptr [ebp+12]   ; destination object
mov eax dword ptr [esi+4]    ; x1 (old class)
mov dword ptr [di+8], eax    ; xl (new class)
```

In the event of a field displaying a modified data type that cannot be allocated to an elementary data type, it is necessary to differentiate between two different cases.

If the base type is "system.object", the object is updated by the eCLR run-time system itself. If the base type is "system-.valuetype", the copy constructor contains code to run the copy constructor of this modified class.

The following example demonstrates the hierarchical structure of a copy constructor in the event of sub-classes of a class being modified.

```
C#
----
structs S { int x1; int x2; }
class X {
int xl;
S sl;)
}
IL code copy constructor X::copyctor:
-----------------------------------
ldfld X: :X1 // int datatype
stfld X*::X1
ldflda X::sl
ldflda X*::sl
call S::copyctor
```

In this case, the intermediate code command ldflda (load address of field) is used to load the addresses of the sub-classes in order to call up the corresponding copy constructor of this class type.

After converting all copy constructors into executable machine code, the eCLR run-time system collects all references to modified classes for which the copy constructors were generated. Such references can, for example, be localized for statistical references in the global data area or for sub-classes in the local call stack or in other objects. If a list of all object references has been generated, the modified objects are regenerated by the eCLR run-time system using the New operator. After being generated and initialized, the objects are copied. Now the copy constructor allocates the current content of the old objects to all new objects.

Up to this point in time, the collection of references and the generation and copying of objects can be repeated in case the eCLR run-time system detects that a thread allocated to the program that is to be modified has been activated during the process.

Next comes the critical phase, which cannot be interrupted, in which all references are modified. In this phase, the program, which is to be modified, is blocked. The pointer allocations and thus the time required for this purpose depend on the number of object instances and their references as well as on the scope of the modifications.

After switching has taken place by modifying the object references, the execution of the program, which has meanwhile been modified, can be resumed. The blocking of the thread is lifted. Another of the eCLR run-time system's functions is to deallocate memory reserves that are no longer required.

A further aspect of the invention is a process that ensures that the real-time criteria stipulated for the control process are adhered to whenever program modifications are carried out. As a rule, control programs are run cyclically. The real-time criteria are defined by the execution intervals of the programs in which the inputs are read, the control programs are run and the outputs are written.

The adherence to the real-time criteria is achieved by subdividing the implementation of program modifications into a preparatory phase and a critical phase, as has already been mentioned above. In order to implement the program modification successfully, no program commands of the control program may be executed in either phase.

The preparatory phase, which entails practically all necessary measures for implementing a program modification (approx. 99%) can be interrupted and repeated any number of times.

In the event of the preparatory phase being interrupted by the execution of a program command, this can be initiated again at any time.

The critical phase includes the activation of the new program. For reasons of consistency, activation must take place for all program objects simultaneously. This explains why this process cannot be interrupted.

Using the present invention, the time required for both phases can be determined precisely. The execution time for implementing a program modification must in any case be shorter than the shortest execution interval of an application program. Typical real-time requirements demand cycle times in the region of approximately 10 ms.

The times to the next activation of a program cycle can be calculated in advance. In the case of programs that are run cyclically, it is therefore also possible to predict when the next execution will take place.

No predictions can be made for event-controlled programs. Here, the duration of the critical phase affects the so-called jitter. Therefore, if an event occurs during the critical phase, it can only be processed by the corresponding program after the critical phase has been completed at the earliest. If the maximum jitter tolerance is smaller than the time required to execute the critical phase of a program, it is not possible to perform a program modification at any time by adhering to the thus defined real-time criteria.

Figure 3:
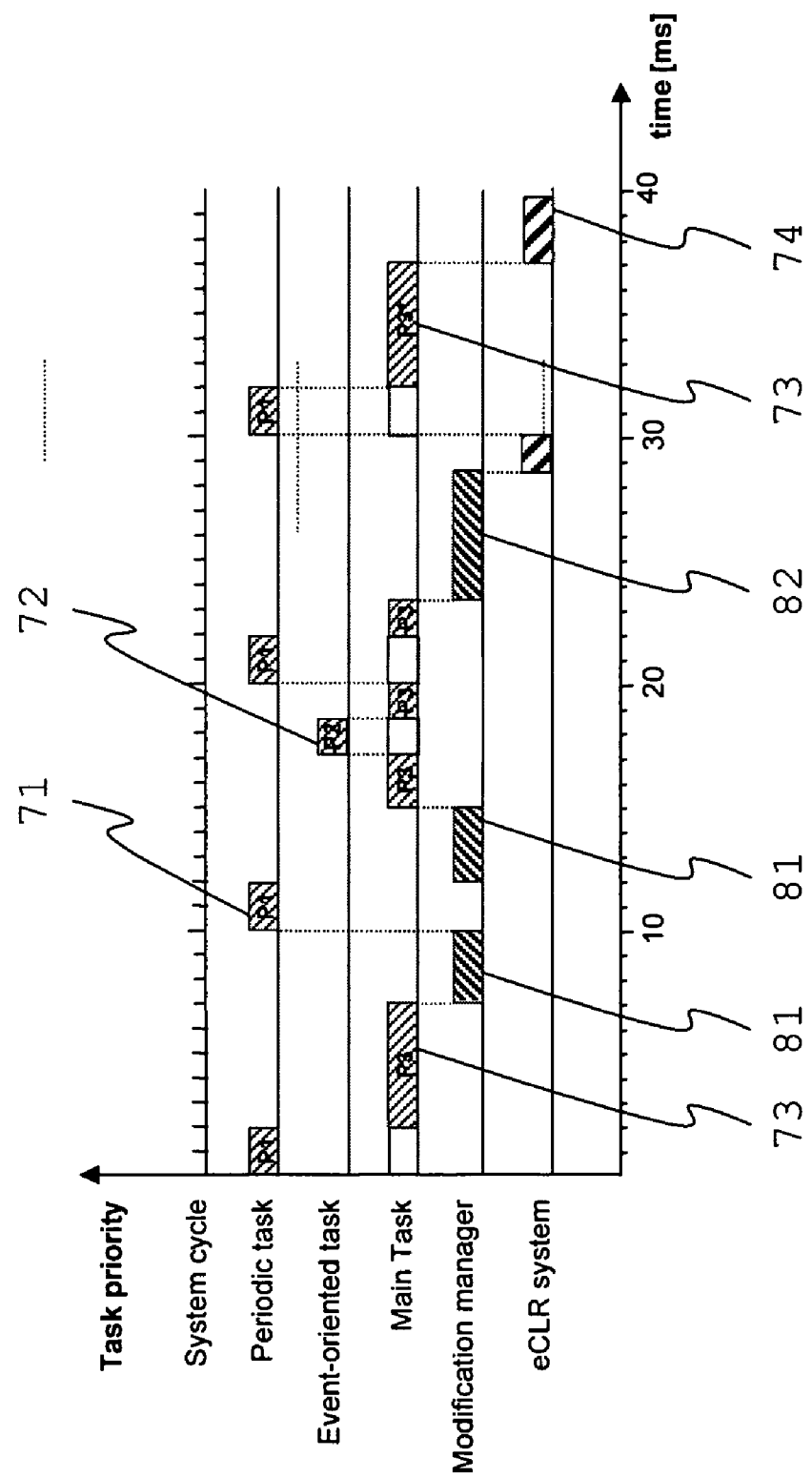
FIG. 3: shows a priority/time diagram detailing several tasks of a running program as well as a task for implementing modifications to this program.

The operating sequence is shown in FIG. 3 by way of an exemplary priority/time diagram, depicting the activity of different tasks with differing priorities in relation to time. If a task switches into an active state, all other tasks with a lower priority will be interrupted.

Task 73 is the main task of the running program with the allocated program module P3. This task is executed periodically with a time interval of 15 ms. Further tasks of the running program depicted in this example include periodical tasks 71 with a time interval of 10 ms and allocated program module P1 as well as and event-oriented task 72 with allocated program module P2. Due to real-time requirements, the tasks allocated to the running program have the highest priority.

The eCLR run-time system referred to as the modification manager in FIG. 3 organizes the program modifications. Tasks 81 and 82, which are allocated to the modification manager, implement the modifications. In this example, Task 81 is started after the main task 73 has switched into an idle state. However, while being executed, task 81 is interrupted by task 71 as it switches to its active state. After that, task 82 for implementing the modifications is restarted, in this example, during the next possible point in time at which the main task 73 switches back to an idle state. Task 82 is not interrupted by any other task, meaning that the modifications were successfully implemented. In this example, program module P3 was changed. Having been successfully modified, modified program module P3* is executed. Task 74 is another task of the eCLR system, used, for example, for communication or debugging.

The invention claimed is:

1. A method for modifying an object-oriented program that is currently being executed by a run time system, in particular a program for controlling an automation facility, where the program in the form of an intermediate code, which can be converted into executable machine code during runtime, is stored temporarily in a memory, including
provision of a modified program or modified program module, also in the form of an intermediate code;
comparison, by the run time system, of the intermediate code of the modified program or modified program module and the intermediate code of the running program to determine the modification, comprising detecting, during the execution of the running program, differences between the intermediate code of the modified program or modified program module and the intermediate code of the running program; and
implementation of the modification in the running program.

2. The method according to claim 1, further comprising using a CIL or MSIL intermediate code as the intermediate code including what is essentially a complete description for the structure of classes.

3. The method according to claim 1, wherein the conversion of the intermediate code into executable machine code takes place by means of a JIT compiler.

4. The method according to claim 1, wherein implementing the modifications includes the following steps: generating one or more first program object(s); copying data contained in one or more second program object(s) into the one or more first program object(s), where the second program object(s) is/are part of the running program; and switching from the one or more second program object(s) to the one or more first program object(s), thus making it part of the running program.

5. The method according to claim 1, further comprising automatically generating a modification program for implementing the modification.

6. The method according to claim 1, wherein after implementing the modification, a memory allocated to program objects that are no longer used is deallocated again.

7. The method according to claim 1, wherein the modification is implemented within a given period, and wherein the period is set subject to at least one reaction time of an automation system controlled by the program and/or subject to at least one execution interval.

8. The method according to claim 1, further comprising determining the time required for implementing the modification by means of simulation.

9. The method according to claim 1, wherein the modification is implemented in at least two substages, of which one or more substage(s) can be repeated at least once.

10. The method according to claim 9, wherein repeating the one or more substage(s) depends on a predefined event taking place in the program sequence.

11. The method according to claim 1, wherein the running program switches cyclically between an active and an idle state and wherein said method comprises calculating one or more points in time when the program switches to its active state.

12. The method according to claim 1, wherein the step of detecting comprises detecting all existing differences between the intermediate code of the modified program or modified program module and the intermediate code of the running program.

13. A run-time system for executing control programs in a control unit of an automation facility, wherein said run-time system can read and write memory contents, wherein the control unit has an addressable memory and a control program is retrievably filed in the form of a first intermediate code in a first memory area; at least parts of the first intermediate code can be converted into executable control commands that are filed in a second memory area while the process is running in the automation facility; the run-time system responds to the provision of a second intermediate code allocated in a third memory area by performing a comparison of the second intermediate code and the first intermediate code comprising detecting differences between the second intermediate code and the first intermediate code, and modifying the process sequence, defined by the first intermediate code, in the automation facility, wherein said run-time system can detect differences between said first intermediate code and said second intermediate code while the control program is executed by the run-time system.

14. The run-time system according to claim 13 that is characterized by the fact that the operating sequence in the automation facility is modified: by selecting at least one partition of the third memory area and at least one storage unit of the second memory area, in which the start address of a partition of the second memory area is stored, by comparing the first intermediate code stored in the first memory area and the second intermediate code stored in the third memory area; by converting the intermediate code stored in the partition of the third memory area into executable control commands, which in turn are stored in a fourth memory area; by copying data from the partition of the second memory area into the partition of the third memory area; and by storing the start address of the fourth memory area in the storage unit of the second memory area.

15. The run-time system according to claim 13, wherein the run-time system is a CLR system.

16. The run-time system according to claim 13, wherein the intermediate code is a CIL or MSIL intermediate code that contains a complete description for the structure of classes.

17. The run-time system according to claim 13, wherein the run-time system converts intermediate code into executable control commands by means of a JIT compiler.

18. The run-time system according to claim 13, wherein the run-time system can generate, store and execute control commands.

19. The run-time system according to claim 13, further comprising effecting a modification in the process sequence of an automation facility within a given period of time.

20. The run-time system according to claim 13, wherein the run-time system can calculate the period required to effect a modification in the process sequence of an automation facility.

21. The run-time system according to claim 13, wherein the routines, which are run in order to effect a modification in the process sequence of an automation facility, can be repeated either in their entirety or partially.

22. The run-time system according to claim 13, which is suitable for executing a method for modifying an object-oriented program that is currently being executed, in particular a program for controlling an automation facility, where the program in the form of an intermediate code, which can be converted into executable machine code during runtime, is stored temporarily in a memory, including provision of a modified program or modified program module, also in the form of an intermediate code; comparison of the intermediate code of the modified program respectively the modified program module and the intermediate code of the running program to determine the modification; and implementation of the modifications in the running program.

23. A method for modifying an object-oriented program for controlling an automation facility that is currently being executed by a run time system, comprising:
  storing the object-oriented program in the form of a first intermediate code, which can be converted into executable machine code during runtime, temporarily in a memory;
  controlling the automation facility using the executable machine code converted from the first intermediate code;
  providing a modified program in the form of a second intermediate code;
  comparing, by the run time system during the execution of the object-oriented program, the second intermediate code to the first intermediate code to detect all existing differences;
  converting the second intermediate code into executable machine code during runtime; and
  controlling the automation facility using the executable machine code converted from the second intermediate code.

* * * * *